United States Patent
Ries-Mueller et al.

(10) Patent No.: US 10,933,725 B2
(45) Date of Patent: Mar. 2, 2021

(54) ELECTRICAL AXLE DRIVE FOR A VEHICLE

(71) Applicant: Robert Bosch GmbH, Stuttgart (DE)

(72) Inventors: Klaus Ries-Mueller, Bad Rappenau (DE); Bernd Eckert, Vaihingen An der Enz (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/310,663

(22) PCT Filed: Jun. 8, 2017

(86) PCT No.: PCT/EP2017/063907
§ 371 (c)(1),
(2) Date: Dec. 17, 2018

(87) PCT Pub. No.: WO2017/216020
PCT Pub. Date: Dec. 21, 2017

(65) Prior Publication Data
US 2019/0263240 A1  Aug. 29, 2019

(30) Foreign Application Priority Data
Jun. 17, 2016 (DE) ..................... 10 2016 210 857.3

(51) Int. Cl.
*B60K 1/00* (2006.01)
*B60K 11/06* (2006.01)

(52) U.S. Cl.
CPC ............... *B60K 1/00* (2013.01); *B60K 11/06* (2013.01); *B60K 2001/001* (2013.01);
(Continued)

(58) Field of Classification Search
CPC ... B60K 6/26; B60K 1/00; B60K 6/52; B60K 6/48
See application file for complete search history.

(56) References Cited

U.S. PATENT DOCUMENTS 2,187,982 A * 1/1940 Moncrief ........... B60H 1/00021
165/43
4,506,561 A * 3/1985 Hayakawa ............ F16H 57/025
74/606 R
(Continued)

FOREIGN PATENT DOCUMENTS

DE     102011076523 A1    11/2012
DE     102011080038 A1     1/2013
(Continued)

OTHER PUBLICATIONS

International Search report with English translation and Written Opinion for Application No. PCT/EP2017/063907 dated Aug. 28, 2017 (12 pages).

*Primary Examiner* — Hau V Phan
(74) *Attorney, Agent, or Firm* — Michael Best & Friedrich LLP

(57) ABSTRACT

The present invention relates to an axle drive for a vehicle, said axle drive comprising at least one electrical machine, at least one power electronics system and at least one transmission, which are arranged in a housing, a first housing partition being situated between the at least one electrical machine and the at least one power electronics system. A further second housing partition is situated between the at least one electrical machine and the at least one transmission. The first housing partition consists of a first material, and/or the second housing partition consists of a second material.

20 Claims, 2 Drawing Sheets

(52) U.S. Cl.
CPC ..... *B60K 2001/003* (2013.01); *B60Y 2200/91* (2013.01); *B60Y 2200/92* (2013.01); *B60Y 2306/05* (2013.01)

(56) References Cited

U.S. PATENT DOCUMENTS

| | | | | |
|---|---|---|---|---|
| 5,562,565 | A * | 10/1996 | Moroto | B60K 6/26 180/65.6 |
| 7,038,344 | B2 * | 5/2006 | Winkler | H02K 5/08 310/156.16 |
| 7,234,387 | B2 * | 6/2007 | Braun | B60T 13/567 92/128 |
| 8,234,954 | B2 * | 8/2012 | Holmes | B60K 6/26 180/65.22 |
| 8,448,541 | B2 * | 5/2013 | Kasuya | B60K 6/387 74/661 |
| 8,561,775 | B2 * | 10/2013 | Osawa | B60K 6/40 192/85.37 |
| 8,636,091 | B2 * | 1/2014 | Sanji | B60K 6/26 180/65.23 |
| 8,903,581 | B2 * | 12/2014 | Bouchon | B60K 6/48 701/22 |
| 9,051,976 | B2 * | 6/2015 | Kuwahara | B60K 6/40 |
| 2003/0024749 | A1 * | 2/2003 | Kobayashi | B60K 6/26 180/65.21 |
| 2003/0234124 | A1 * | 12/2003 | Pecnik | B60K 6/26 180/65.25 |
| 2004/0232250 | A1 * | 11/2004 | Hielm | F01P 3/20 237/12 |
| 2006/0081406 | A1 * | 4/2006 | Kano | B60K 6/365 180/65.6 |
| 2007/0107960 | A1 * | 5/2007 | Takami | B60K 6/405 180/65.6 |
| 2009/0100965 | A1 * | 4/2009 | Sanji | B60K 6/26 74/606 R |
| 2010/0236845 | A1 * | 9/2010 | Ishii | A01D 34/66 180/65.6 |
| 2012/0118652 | A1 * | 5/2012 | Yamamoto | B60K 6/52 180/65.6 |
| 2014/0014422 | A1 * | 1/2014 | Hirashita | B60K 1/00 180/65.6 |
| 2015/0292812 | A1 * | 10/2015 | Tomita | F28F 1/40 165/177 |

FOREIGN PATENT DOCUMENTS

| | | |
|---|---|---|
| DE | 102013204766 A1 | 9/2014 |
| WO | 2012107826 A1 | 8/2012 |

* cited by examiner

ELECTRICAL AXLE DRIVE FOR A VEHICLE

BACKGROUND OF THE INVENTION

The present invention relates to an axle drive for an electrically operated vehicle, including an electrical machine, a power electronics system and a transmission.

Currently available vehicles with an electrical drive (pure electric vehicles, hybrid vehicles with combined electric-motor and internal-combustion-engine drives, or fuel-cell vehicles) are relatively expensive in comparison with standard vehicles with an internal-combustion-engine drive owing to their high technical complexity. In order to increase market acceptance of electrical drives and thus replace large numbers of vehicles driven by internal combustion engines, there is an extreme cost pressure. The drive unit of such a vehicle comprises an electric motor, which is generally connected to the wheels by a transmission. The drive unit furthermore has a power electronics system with an inverter which supplies the electric motor with power. Moreover, the drive unit has an energy storage device, which is usually embodied as a battery.

By way of example, DE 10 2011 076 523 A1 discloses an arrangement for driving a vehicle having an electrical axle drive. An electrical machine as a drive is coupled as a drive via a transmission comprising an intermediate transmission and an axle differential. In order to achieve the smallest possible dimensions for the axle drive, the components are mounted close to the axle in a housing.

Moreover, an electric vehicle axle arrangement and a vehicle, in particular a motor vehicle having an electric vehicle axle arrangement, are furthermore known from DE 10 2013 204 766 A1, for example.

The electric vehicle axle arrangement has a vehicle axle, on which vehicle wheels can be mounted. The electric vehicle axle arrangement furthermore has a transmission, which is operatively connected to the vehicle axle, and an electric motor, which is coupled to the transmission in order to transmit torque to the vehicle wheels connected to the vehicle axle.

The electric vehicle axle arrangement furthermore has a power electronics system with an inverter, which is electrically connected to the electric motor in order to feed the electric motor with electric power.

The components of this electric vehicle axle arrangement are arranged in a common housing and furthermore have a common cooling circuit for removing heat from the components by means of a liquid cooling medium.

It has been found that, in axle drive concepts of this kind, a large outlay for the liquid cooling of the power electronics system, of the electrical machine and of the transmission is disadvantageously required, owing to the removal of heat by a liquid cooling medium. In general, the overall cooling system comprises cooling ducts in the housing of the electric vehicle axle arrangement, a heat exchanger for dissipating the heat to the environment, a pump for circulating the cooling medium, a control element for controlling the cooling circuit in accordance with the operating and environmental conditions and pipes and hoses for connecting the individual components of the cooling system.

Owing to the heat removal requirements, only the electrical machine and the transmission are coupled in the case of compact axle drive concepts. The required power electronics system is not integrated into the compact axle drive and is mounted at a distance from the axle drive on the vehicle body and connected to the axle drive by cables.

The high outlay for heat removal from the drive and the lack of integration of the power electronics system in the case of compact drive designs disadvantageously leads to axle drive designs that cannot be used in a flexible way and are not optimum in terms of cost.

SUMMARY OF THE INVENTION

It is the underlying object of the present invention to provide a simplified cooling concept for an electrical axle drive which is embodied in a manner optimized in terms of cost and weight and which takes account of the different heat removal requirements of the individual components of the electrical axle drive in an advantageous way.

The arrangement according to the invention has the advantages that a simplified cooling concept for an electrical axle drive for a vehicle is provided which is embodied in a manner optimized in terms of cost and weight.

To this end, provision is made, according to the invention, for the axle drive for a vehicle to comprise an electrical machine, a power electronics system and a transmission, wherein these are arranged in a housing and wherein a first housing partition is situated between the electrical machine and the power electronics system and wherein a second housing partition is situated between the electrical machine and the transmission, wherein the first housing partition consists of a first material, and/or the second housing partition consists of a second material. The concept underlying the present invention advantageously consists in that an electrical axle drive for vehicles is provided in which the components of the electrical axle drive are grouped together or arranged adjacent to one another or spatially as close as possible to one another in a housing and can be cooled by means of air. By means of the housing partitions according to the invention consisting of different materials between the components of the electrical axle drive unit, spaces are created for these components, which require different heat removal standards and operating conditions.

Here, the partitions consisting of different materials advantageously allow selective control of the outflow of heat. It is thereby possible to achieve improved and less expensive cooling of the components of the electrical axle drive since there is no need to form devices for cooling by means of a liquid cooling medium on the electrical axle drive and the components thereof. Furthermore, the additional components of the liquid cooling system, which are generally arranged in the vehicle at a distance from the component from which heat is to be removed, such as the heat exchanger (for dissipating the heat to the environment), the pump (for circulating the cooling medium), the control element (for controlling the cooling circuit in accordance with the operating and environmental conditions) and any pipes and hoses (e.g. for connecting the individual components of the cooling system), are advantageously eliminated.

It is advantageous if the first material M1 of the first housing partition is thermally insulating. Using a thermally insulating material M1 for the first housing partition avoids the unwanted heating of the power electronics system by the waste heat from the electrical machine. Accelerated aging or damage of the power electronics system due to heating (thermal failure) is thereby prevented. Moreover, unwanted contamination of the power electronics system by the electrical machine is furthermore prevented as an additional positive side effect.

It is advantageous if the second material M2 of the second housing partition has a very high thermal conductivity. If the additional second housing partition arranged between the at least one electrical machine and the transmission consists of a material M2 with a very high thermal conductivity, the desired heat exchange between the electrical machine and the transmission is preferentially enabled. The electrical machine is a component subject to high losses. Both the electrical machine and the transmission are components with relatively high operating temperatures. By making the first and second housing partitions from the abovementioned materials M1 and M2, the heat flux is advantageously blocked in the direction of the power electronics system, while it is guided preferentially in the direction of the transmission. As a result, the transmission, which operates as a component with a relatively high operating temperature and a relatively high heat capacity, is selectively heated and thus advantageously used as a heat buffer.

In an advantageous development of the electrical axle drive unit, the components comprising the power electronics system and the transmission of the electrical axle drive unit are arranged adjacent to one another in a common housing, being separated by a third housing partition. By means of the additional third housing partition consisting of the third material M3 between the power electronics system and the transmission in the common housing, further enclosed spaces are created, thereby shielding the components from one another.

It is advantageous if the third material M3 of the third housing partition is thermally insulating. Using a thermally insulating material M3 for the third housing partition avoids the unwanted heating of the power electronics system by the waste heat from the transmission. Accelerated aging or damage of the power electronics system due to heating (thermal failure) is thereby prevented. Moreover, unwanted contamination of the power electronics system by the transmission is prevented.

It is furthermore advantageous that the material M2 of the second housing partition consists of copper or of a copper alloy. The use of copper as a material with a very high thermal conductivity has the advantage that the desired heat exchange between the electrical machine and the transmission is preferentially enabled. This has the advantage that quicker heating of the transmission to the operating temperature thereof is achieved by means of the waste heat from the electrical machine.

It is advantageous if the first housing partition between the electrical machine and the power electronics device is embodied with at least one smooth surface in order to avoid the unwanted heating of the power electronics system by the waste heat from the electrical machine.

It is furthermore advantageous that the second housing partition between the electrical machine and the transmission is embodied with at least one rough surface in order to achieve the preferred quicker heating of the transmission by the waste heat from the electrical machine to the operating temperature of the transmission. Rough surfaces have a larger surface area than surfaces of smooth design and can thus radiate heat more effectively than is the case with smooth surfaces.

In an advantageous development of the invention, the third housing partition between the power electronics system and the transmission is embodied with at least one smooth surface in order to avoid the unwanted heating of the power electronics system by the waste heat from the transmission.

It is advantageous if the second housing partition between the electrical machine and the transmission is embodied with at least one cooling fin in order to preferentially enable the desired quicker heat exchange between the electrical machine and the transmission. This has the advantage that quicker heating of the transmission to the operating temperature thereof is achieved by means of the waste heat from the electrical machine.

In an advantageous development of the invention, the housing of the electrical axle drive unit is designed in such a way that heat can be removed therefrom in a passive way. For passive cooling, the housing is embodied with a rough surface on its outside. This is associated with the advantage of improved heat transfer to the environment.

To enlarge the surface area, it is advantageous if the outer surface of the housing is constructed with one or more additional cooling fins. This has the advantage of improved heat dissipation to the environment. Moreover, cooling fins have the advantage that they can be formed in a simple and inexpensive manner on the housing, e.g. by casting the housing.

It is advantageous if the cooling fin of the second housing partition between the electrical machine and the transmission or the cooling fin on the outer surface of the housing is embodied with a rough surface for advantageous improved heat dissipation to the environment.

In an advantageous development of the invention, the housing of the electrical axle drive unit is designed for heat removal by cooling air. This is associated with the advantage that it provides a simplified cooling concept for an electrical axle drive for a vehicle which is additionally embodied in a manner optimized in terms of cost and weight.

It is furthermore advantageous to provide the housing of the electrical axle drive unit with openings in such a way that heat is removed directly from the interior region of the housing by cooling air. This is likewise associated with the advantage that a simplified cooling concept for an electrical axle drive for a vehicle is provided which is additionally embodied in a manner optimized in terms of cost and weight and in which liquid cooling is dispensed with.

Further features and advantages of the present invention will be apparent to a person skilled in the art from the following description of illustrative embodiments, which, however, should not be interpreted as restricting the invention, with reference to the attached drawings.

All the figures are merely schematic illustrations of arrangements according to the invention or the constituent parts thereof in accordance with illustrative embodiments of the invention. Spacings and size ratios, in particular, are not produced true to scale in the figures. In the various figures, corresponding elements are provided with the same reference numbers.

DETAILED DESCRIPTION

Figure 1:
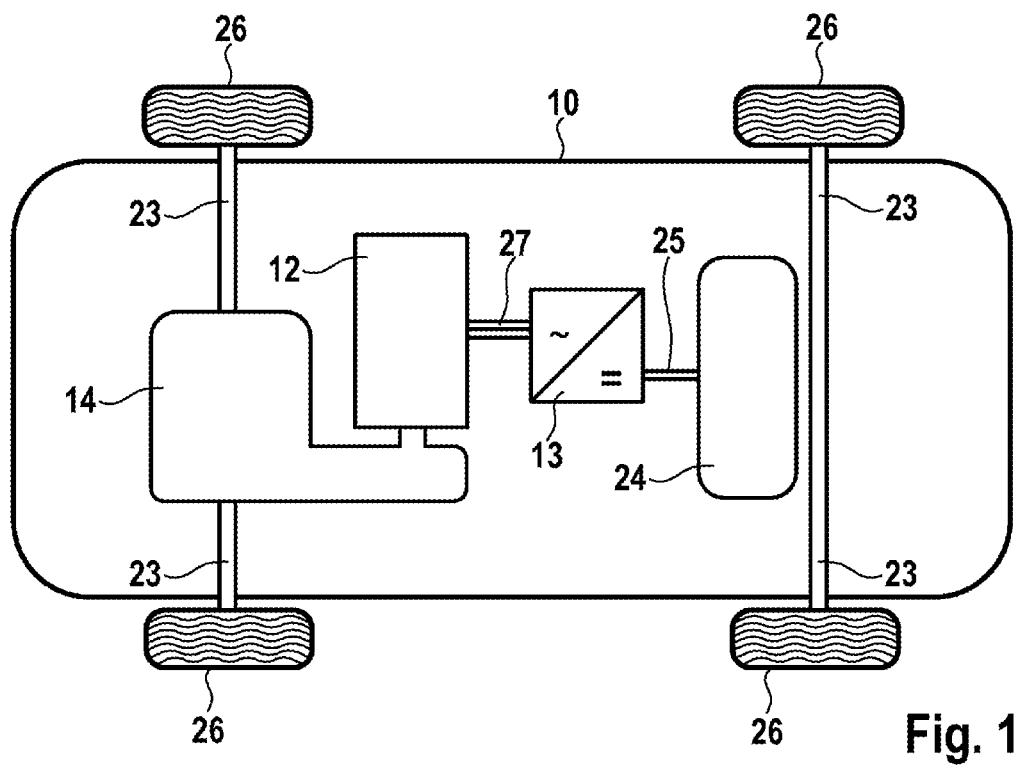
FIG. 1 shows a schematic view of a vehicle having an electrical drive, the components of which are embodied as separate units.

FIG. 1 shows a schematic view of a vehicle 10 having an electrical drive unit 11, the drive components 12, 13, 14 of which are embodied as separate units with electrical and mechanical interfaces. As described above, the electrical drive unit of a vehicle 10, e.g. of an electric or hybrid vehicle, has an electric motor 12, which is generally coupled to a vehicle axle 23 and the wheels 26 thereon via a transmission 14. The drive unit furthermore has a power electronics system 13. Here, the power electronics system 13 has an inverter, which is electrically connected to the electrical machine in order to supply the latter with power or, during the braking process, to feed the electrical energy produced back into the energy storage device 24. This energy storage device 24 is usually embodied as a battery and connected electrically to the inverter. The function of the inverter of the power electronics system 13 is to convert the DC voltage supplied by the energy storage device 24 via the DC connection cable 25 into an AC voltage for supplying the electrical machine via the AC connection cable 27. The AC voltage is usually in the form of a rotating field comprising at least 3 AC voltages. By means of the electrical machine 12, the vehicle axle 23 of the vehicle 10 is driven via the associated transmission 14, and a torque is transmitted to the wheels 26 of the vehicle axle 23. The components are all embodied as separate units having a thermal interface for heat removal (not shown here) and an electrical interface. The lost energy arising in the electrical machine 12 and in the power electronics system 13 is usually dissipated via a cooling circuit of a liquid cooling system. Typically, the transmission 14 is cooled passively via the transmission housing. The lost power to be dissipated in this case is relatively small since the transmission 14 has a very high efficiency. The electrical energy storage device 24 is either air-cooled or provided with heat removal by means of a separate liquid cooling circuit, from which heat is removed via a refrigerating circuit by means of the air-conditioning system of the vehicle 10.

Figure 2:
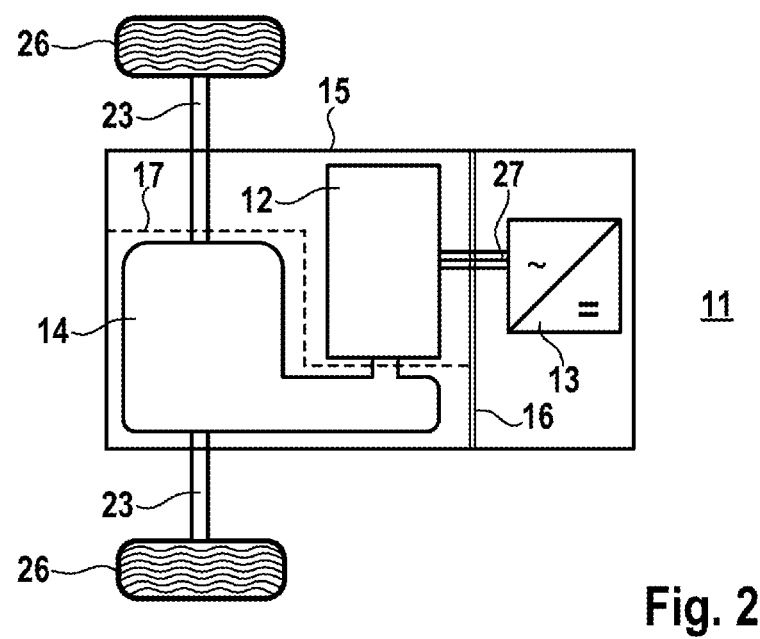
FIG. 2 shows a schematic view of an electrical axle drive unit for a vehicle in accordance with a first embodiment of the invention.

In the first embodiment of the invention, which is shown in FIG. 2, the components 12, 13, 14 of the electrical axle drive unit 11 are arranged in a common housing 15. Identical elements in relation to FIG. 1 are provided with the same reference signs and are not explained in detail. This common housing 15 is subdivided by housing partitions 16, 17 into enclosed spaces, in which the components 12, 13, 14 are arranged.

The first enclosed space is formed by the common housing 15 and the first housing partition 16 and accommodates the power electronics system 13. For thermal insulation between the electrical machine 12 and the power electronics system 13, the first housing partition 16 is produced from a thermally insulating material M1. This material has a significantly lower thermal conductivity than the material of the housing of the axle drive 15. This ensures that there is only insignificant heating of the power electronics system, if any, by the waste heat from the electrical machine, in spite of the spatially compact assembly of the power electronics system 13 and the electrical machine 12.

To achieve this, a metal alloy of low thermal conductivity, an air chamber structure, e.g. a honeycomb sandwich, or a plastic with a low thermal conductivity can be used for the thermally insulating material M1 of the first housing wall 16, for example.

Owing to the adjacent arrangement of the electrical machine 12 and of the power electronics system 13, the AC connection cable 27 can be eliminated and replaced, for example, by simple electrical connections such as busbars or pressed screens.

In the remaining space in the common housing 15, the second housing partition 17 forms two enclosed spaces, which respectively accommodate the electrical machine 12, on the one hand, and the transmission 14, on the other hand. For thermal coupling between the electrical machine 12 and the transmission 14, the second housing partition 17 is produced from a material M2 with a very high thermal conductivity.

The two components comprising the electrical machine 12 and the transmission 14 are thereby thermally interconnected. This has the advantage that the transmission is heated up by the waste heat from the electrical machine and thus reaches its operating temperature more quickly. Likewise, the large thermal mass of the transmission 14 can absorb thermal peak loads of the electrical machine 12 and thus protect the electrical machine from thermal overloading.

To connect the electrical machine 12 thermally to the transmission 14, a material M2 with a very good heat transfer coefficient, e.g. the metallic material copper or aluminum, which has very good thermal conductivity, is used for the second housing wall 17.

Figure 3:
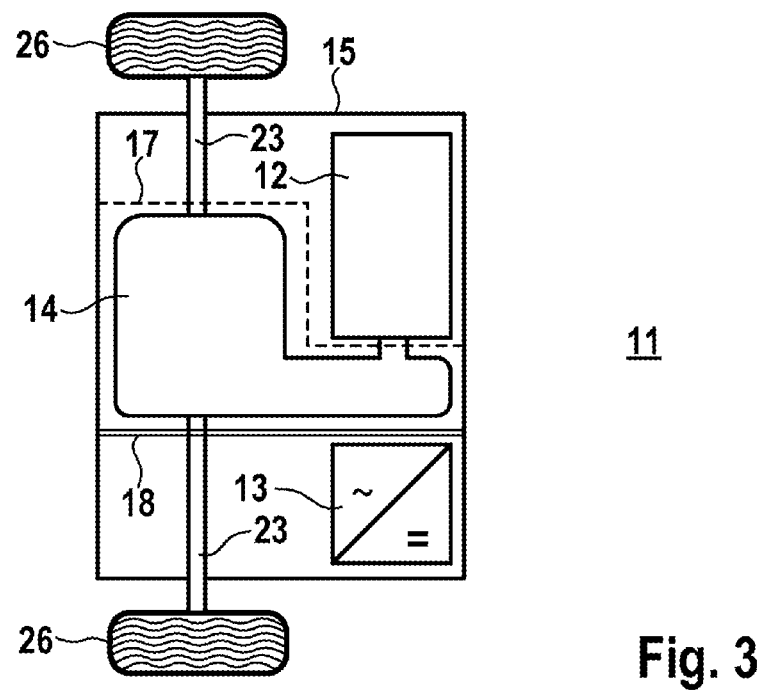
FIG. 3 shows a schematic view of an electrical axle drive unit for a vehicle in accordance with another embodiment of the invention.

In the embodiment of the invention which is shown in FIG. 3, the components 12, 13, 14 of the electrical axle drive unit 11 are arranged in a common housing 15. Identical elements in relation to FIG. 1 are provided with the same reference signs and are not explained in detail. This common housing is subdivided by housing partitions 17, 18 into enclosed spaces, in which the components 12, 13, 14 are arranged.

The first enclosed spaces are formed by the common housing 15 and the housing partitions 17 and 18, accommodating the electrical machine 12 and the transmission 14. For thermal coupling between the electrical machine 12 and the transmission 14, housing partition 17 is produced from a material with a very high thermal conductivity.

A further enclosed space is formed by the common housing 15 and housing partition 18, accommodating the power electronics system 13. For thermal insulation between the transmission 14 and the power electronics system 13, housing partition 18 is produced from a thermally insulating material (M3). This material has a significantly lower thermal conductivity than the material of the housing of the axle drive 15. This ensures that there is only insignificant heating of the power electronics system, if any, by the waste heat from the transmission despite the assembly of the transmission 14 and the power electronics system 13. Moreover, unwanted contamination of the power electronics system 13 by the transmission 14 is prevented. To achieve this, a metal alloy of low thermal conductivity, an air chamber structure, e.g. a honeycomb sandwich, or a plastic with a low thermal conductivity can be used, for example. Owing to the adjacent arrangement of the electrical machine 12 and of the power electronics system 13, the AC connection cable 27 can be eliminated and replaced, for example, by a simple electrical connection such as busbars or pressed screens, which are passed through the transmission 14 if required. In the illustrative embodiment shown in FIG. 3, the energy storage device (not shown here) is arranged in the vehicle 10 outside the housing 15 of the electrical axle drive unit 11. The arrangement of the components 12, 13, 14 of the electrical axle drive 11 in a common housing 15 advantageously allows a highly integrated, compact, cost- and weight-optimized electrical axle drive 11 with power electronics system 13. This electrical axle drive 11 can likewise be constructed close to the axle and can therefore be used flexibly.

Figure 4:
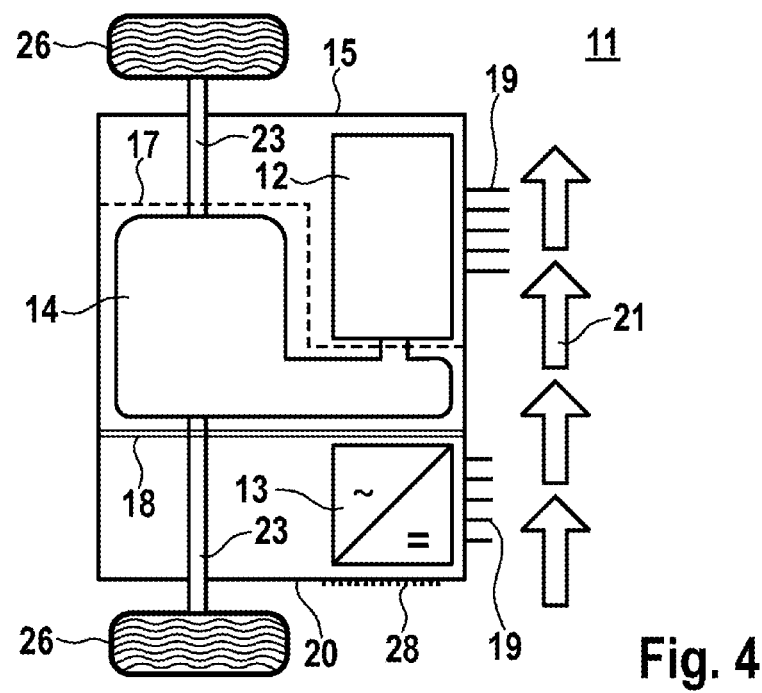
FIG. 4 shows a schematic view of an electrical axle drive unit for a vehicle in accordance with another embodiment of the invention.

FIG. 4 shows, in a schematized view, a compact and highly integrated electrical axle drive 11 for an axle with devices for air cooling of the axle drive unit. For this purpose, the common housing 15 is equipped with cooling fins 19 and is swept over by a cooling air flow 21 in such a way that heat is removed first of all from the power electronics system 13. As the cooling air flow progresses, heat is removed from the other components comprising the transmission 14 and the electrical machine 12 of the electrical axle drive 11. To improve heat transfer to the cooling air 21, both the cooling fins 19 and the remaining surface of the housing 15 can be provided with a rough surface 28. Within the housing, the second housing partition 17 can be provided with cooling fins 19 (not shown here) in order to improve heat transfer between the electrical machine 12 and the transmission 14.

In order to achieve a particularly compact construction of the electrical axle drive unit 11, the spacings between the components 12, 13, 14 and the outer walls of the housing 15 and the housing partitions 16, 17, 18 can be eliminated. Surface connection of the components 12, 13, 14 to the common housing 15 is thereby likewise achieved.

A very compact construction of the electrical axle drive unit 11 is achieved if a dedicated housing is not provided for the components 12, 13, 14, and these components are mounted directly in the common housing 15.

A very compact and inexpensive construction of the electrical axle drive unit 11 can likewise be achieved if the component housings of the components 12, 13, 14 form the common housing 15 together with the housing partitions 16, 17, 18, without further housing elements.

Another inexpensive and compact design of the electrical axle drive unit 11 is obtained if the common housing 15 is configured in such a way that the cooling air flow 21 is guided within the housing 15 and the cooling fins 19 and rough surfaces 18 are formed on the inside of the housing. In the illustrative embodiment shown in FIG. 4, the energy storage device (not shown here) is arranged in the vehicle 10 outside the housing 15 of the electrical axle drive unit 11.

In an advantageous development of the axle drive 11 (electrical axle drive unit), the power electronics system 13 is equipped with switches 29 and/or diodes 30 based on SiC (silicon carbide) as a semiconductor material, which have a significantly lower power loss than switches and/or diodes based on the currently conventional semiconductor material silicon. This has the advantage that the outlay for removal of heat from the power electronics system 13 correspondingly falls by virtue of the significant reduction in power loss.

The components comprising the power electronics system 13, the electrical machine 12 and the transmission 14 of the electrical axle drive unit 11 are advantageously arranged in such a way that a guided cooling air jet first of all removes heat from the power electronics system 13 and only then sweeps over and removes heat from the components comprising the electrical machine 12 and the transmission 14. This is associated with the advantage that the unwanted heating of the power electronics system 13 by the waste heat from the transmission 14 and the electrical machine 12 is avoided. As a result, accelerated aging or damage of the power electronics system 13 due to heating (thermal failure) is prevented.

Although the present invention has been fully described above by means of preferred illustrative embodiments, it is not restricted thereto but can be modified in many different ways. In particular, the illustrative embodiments described above with reference to FIGS. 2 to 4 can also be combined with one another, as can, in particular, individual features thereof.

The invention claimed is:

1. An axle drive (11) for a vehicle (10), said axle drive comprising at least one electrical machine (12), at least one power electronics system (13) and at least one transmission (14), which are arranged in a housing (15), wherein a first housing partition (16) is situated between the at least one electrical machine (12) and the at least one power electronics system (13), wherein a second housing partition (17) is situated between the at least one electrical machine (12) and the at least one transmission (14), wherein the first housing partition (16) is made of a first material (M1) configured to insulate the at least one power electronics system (13) from heat generated by the at least one electrical machine (12) to avoid unwanted heating of the at least one power electronics system (13) by waste heat from the at least one electrical machine (12), and the second housing partition (17) is made of a second material (M2) configured to facilitate heat exchange between the at least one electrical machine (12) and the at least one transmission (14) to heat the at least one transmission (14) with the waste heat from the at least one electrical machine (12) such that the at least one transmission (14) is used as a heat buffer, and wherein the second material (M2) is different from the first material (M1).

2. The axle drive (11) as claimed in claim 1, wherein the first material (M1) of the first housing partition (16) is thermally insulating.

3. The axle drive (11) as claimed in claim 2, wherein the second material (M2) of the second housing partition (17) has a very high thermal conductivity.

4. The axle drive (11) as claimed in claim 3, wherein a third housing partition (18) made of a third material (M3) is situated between the at least one transmission (14) and the at least one power electronics system (13).

5. The axle drive (11) as claimed in claim 4, wherein the third material (M3) of the third housing partition (18) is thermally insulating.

6. The axle drive (11) as claimed in claim 4, wherein the third housing partition (18) is smooth on at least one side.

7. The axle drive (11) as claimed in claim 1 wherein the second material (M2) is made of copper or of a copper alloy.

8. The axle drive (11) as claimed in claim 1, wherein the first housing partition (16) is smooth on at least one side.

9. The axle drive (11) as claimed in claim 1, wherein the second housing partition (17) is rough on at least one side.

10. The axle drive (11) as claimed in claim 1, wherein the second housing partition (17) has at least one cooling fin (19).

11. The axle drive (11) as claimed in claim 10, wherein the surface of the cooling fin is rough.

12. The axle drive (11) as claimed in claim 1, wherein one housing outer wall (20) is rough.

13. The axle drive (11) as claimed in claim 1, wherein the housing outer wall (20) has at least one cooling fin (19).

14. The axle drive (11) as claimed in claim 1, wherein the housing outer wall (20) is cooled by cooling air (21).

15. The axle drive (11) as claimed in claim 1, wherein an interior region (22) of the housing (15) is cooled by cooling air (21).

16. The axle drive (11) as claimed in claim 1, wherein a third housing partition (18) made of a third material (M3) is situated between the at least one transmission (14) and the at least one power electronics system (13).

17. The axle drive (11) as claimed in claim 16, wherein the third material (M3) of the third housing partition (18) is thermally insulating.

18. An axle drive (11) for a vehicle (10), said axle drive comprising at least one electrical machine (12), at least one power electronics system (13) and at least one transmission (14), which are arranged in a housing (15), wherein a first housing partition (16) is situated between the at least one electrical machine (12) and the at least one power electronics system (13), wherein a second housing partition (17) is situated between the at least one electrical machine (12) and the at least one transmission (14), and wherein the first housing partition (16) is made of a first material (M1) configured to insulate the at least one power electronics system (13) from heat generated by the at least one electrical machine (12) to avoid unwanted heating of the at least one power electronics system (13) by waste heat from the at least one electrical machine (12), the second housing partition (17) is made of a second material (M2) configured to facilitate heat exchange between the at least one electrical machine (12) and the at least one transmission (14) to heat the at least one transmission (14) with the waste heat from the at least one electrical machine (12) such that the at least one transmission (14) is used as a heat buffer, the second material (M2) being different than the first material (M1), and the first material (M1) having a lower thermal conductivity than a material of the housing (15).

19. The axle drive (11) as claimed in claim 18, wherein the first material (M1) of the first housing partition (16) is thermally insulating, wherein the first housing partition (16) includes at least one of an air chamber structure or a honeycomb sandwich structure.

20. The axle drive (11) as claimed in claim 18, wherein the second material (M2) of the second housing partition (17) has a very high thermal conductivity.

* * * * *